(12) United States Patent
Zhang

(10) Patent No.: US 7,387,390 B2
(45) Date of Patent: Jun. 17, 2008

(54) SINGLE-PANEL PROJECTION SYSTEM

(75) Inventor: Kuang-Wei Zhang, Gong Ming Town (CN)

(73) Assignee: Asia Optical Co., Inc., Taichung (TW)

( * ) Notice: Subject to any disclaimer, the term of this patent is extended or adjusted under 35 U.S.C. 154(b) by 313 days.

(21) Appl. No.: 11/239,117

(22) Filed: Sep. 30, 2005

(65) Prior Publication Data

US 2006/0170872 A1  Aug. 3, 2006

(30) Foreign Application Priority Data

Feb. 2, 2005 (TW) .............................. 94103189 A

(51) Int. Cl.
*G03B 21/14* (2006.01)

(52) U.S. Cl. ..................... 353/31; 353/99; 353/33; 359/639

(58) Field of Classification Search ............. 353/31, 353/33, 34, 37, 81, 98, 99; 349/5, 7, 8, 9; 359/634, 639, 640; 348/742, 743, 771
See application file for complete search history.

(56) References Cited

U.S. PATENT DOCUMENTS

| 5,510,861 | A | * | 4/1996 | Minich et al. ............... 353/119 |
| 5,801,795 | A | * | 9/1998 | Ogino ............................ 349/5 |
| 6,540,362 | B1 | * | 4/2003 | Janssen ........................ 353/31 |
| 6,893,133 | B1 | * | 5/2005 | Tang ............................. 353/81 |
| 2002/0191154 | A1 | | 12/2002 | Shahzad et al. |
| 2004/0263788 | A1 | | 12/2004 | Kim et al. |

* cited by examiner

*Primary Examiner*—William C. Dowling

(57) ABSTRACT

A single-panel projection system (1) includes a lighting device for generating collimated light, a beam splitter (30) for splitting the collimated light into a plurality of collimated beams, a color separator (40) for separating each collimated beam into a red, a green and a blue color beams, a color scrolling wheel (50) having a plurality of reflecting areas with different thicknesses and being rotated at a predetermined speed for scrolling the color beams, an imaging device (60) for imaging a picture by modulating the scrolled color beams according to image signals provided by an image, and a projecting lens (70) for magnifying the picture and projecting the magnified picture onto a screen.

22 Claims, 4 Drawing Sheets

SINGLE-PANEL PROJECTION SYSTEM

BACKGROUND OF THE INVENTION

1. Field of the Invention

The present invention relates generally to a projection system, and more particularly to a single-panel projection system with a compact structure and high light efficiency.

2. Description of the Prior Art

In a conventional projection system, an imaging device, such as a liquid crystal display (LCD), a digital micromirror device (DMD), or a liquid crystal on silicon (LCoS), controls the on/off operation of light emitted from a light source on a pixel-by-pixel basis and forms a picture, and a magnifying projection optical system enlarges the picture to be displayed on a large screen.

The projection systems are classified into three-panel projection systems and single-panel projection systems according to the number of imaging devices that are used. The three-panel projection system provides better light efficiency than the single-panel projection system, but is more complicated and expensive, and requires more time in assembly than the single-panel projection system. The single-panel projection system includes a smaller optical system than the three-panel projection system, but provides light efficiency of only one third of the three-panel projection system. More specially, in a single-panel projection system, white light radiated from a white light source is separated into three color beams, which are respectively red (R), green (G) and blue (B) color beams, using color separators, and the three color beams are sequentially sent to one imaging device. The imaging device operates according to the sequence of the color beams to create images. Therefore, synthetically considering the factors of the cost, the assembly process, the light efficiency, and the like, a projection system which has not only high light efficiency but also simple structure is urgently needed in the art.

A color scrolling method, which enhances the light efficiency for the single-panel projection system, has been recently developed. With the color scrolling method, R, G and B beams are simultaneously sent to different locations on an imaging device. Since an image cannot be produced until all of the R, G and B beams reach each pixel of the imaging device, the R, G and B color beams are moved at a constant speed by a color scrolling means.

A conventional single-panel scrolling projection system is disclosed in U.S. Patent Application Publication No. 2002/0191154 A1. As disclosed, white light emitted from a light source passes through first and second lens arrays, a polarization conversion system (PCS), and a condenser lens, and is separated into a red (R), a green (G) and a blue (B) color beams by first through fourth dichroic filters. Each color beam R, G and B is reflected by or continuously transmits through the dichroic filters. For example, the blue color beam is reflected by the first dichroic filter and incident into a first prism. The green color beam is transmitted through the first dichroic filter, reflected by the second dichroic filter, and incident into a second prism. The red color beam is transmitted through the first and second dichroic filters, and incident into a third prism. As the first, second, and third prisms are rotated at constant speed, the color beams R, G and B are scrolled while passing through the first, second, and third prisms. The green and blue beams G and B are then transmitted and reflected by the third dichroic filter 112, and combined with each other. The red, green and blue beams R, G and B are then combined by the fourth dichroic filter. The combined beam is transmitted by a polarization beam splitter (PBS) and forms a picture using an imaging device. The picture is finally projected onto a screen by a projection lens.

Since the conventional projection system uses different light paths for different color beams R, G and B, a light path correction lens must be included for each color beam R, G and B. Therefore, the conventional projection system is bulky, and the manufacture and assembly of the conventional system are complicated, thus decreasing the yield. Furthermore, the first, second, and third scrolling prisms are rotated by three motors respectively, which generates much noise during operation. Additionally, the conventional projection system uses many optical components including at least three prisms and six dichroic filters. This makes it difficult to reduce the manufacture cost.

Hence, an improved projection system is required to overcome the above-mentioned disadvantages of the prior art.

SUMMARY OF THE INVENTION

The objective, therefore, of the present invention is to provide a single-panel projection system which has low cost, a compact structure and relating high light efficiency.

In order to achieve the above objective and overcome the above-identified deficiencies in the prior art, a single-panel projection system comprises a lighting device that provides collimated light, a beam splitter that splits the collimated light into a plurality of separate collimated beams, a color separator that separates each collimated beam into a plurality of color beams, a color scrolling wheel having a plurality of reflecting areas for scrolling the color beams, an imaging device that images a picture thereon according to the scrolled color beams and an image signal, and a projecting lens that magnifies the picture and projects the magnified picture onto a screen. The beam splitter comprises a plurality of reflecting portions disposed in different positions of the light path of the collimated light for respectively reflecting the collimated light to form the collimated beams. Each reflecting portion has a predetermined width. Every two adjacent reflecting portions are spaced at a predetermined interval. The color beams have a total width corresponding to the sum of the predetermined width and the predetermined interval. The color scrolling wheel is substantially in the shape of a disk having a geometrical axis and rotatable about the axis, and is slantingly disposed on the light path of the color beams so that the reflecting areas are located in different distances from the optical axis of the color beams.

Other objects, advantages and novel features of the invention will become more apparent from the following detailed description of a preferred embodiment when taken in conjunction with the accompanying drawings.

BRIEF DESCRIPTION OF THE DRAWINGS

The present invention may best be understood through the following description with reference to the accompanying drawings, in which.

DETAILED DESCRIPTION OF THE PREFERRED EMBODIMENT

Reference will now be made in detail to preferred embodiments of the present invention.

Figure 1:
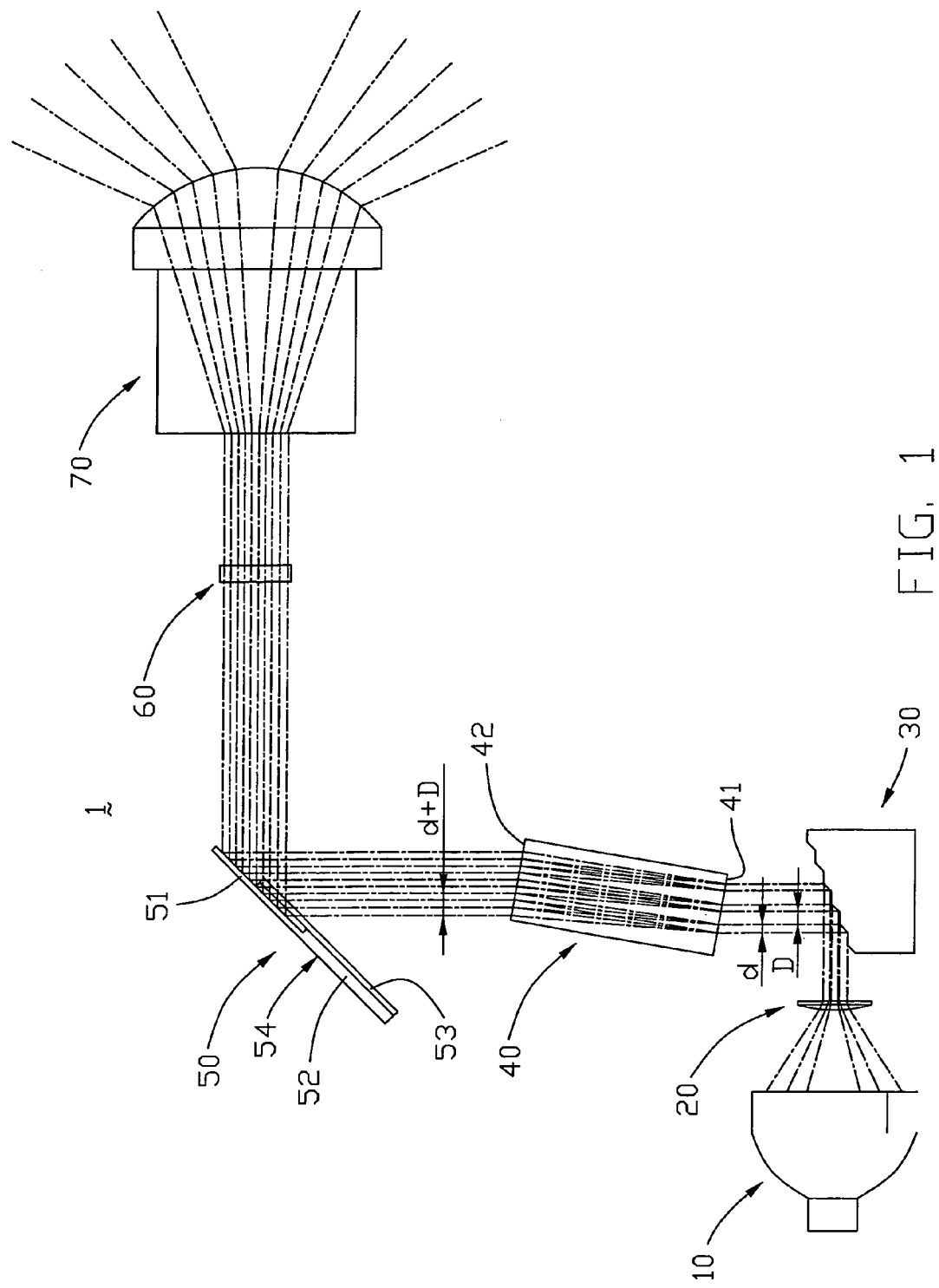
FIG. 1 is a schematic diagram of a projection system according to a first embodiment of the present invention, mainly showing the basic optical components and the optical paths thereof.

Referring to FIG. 1, a projection system 1 in accordance with the present invention is a single-panel projection system that can be applied in a projection type display apparatus. The projection system 1 comprises an irradiation unit, a color separation unit, and an imaging display unit. The irradiation unit comprises a lighting device that generates collimated light and a beam splitter 30 that splits the collimated light into a plurality of separate collimated beams each having a width of "d". Every two adjacent collimated beams are spaced at an interval of "D". More particularly, in the preferred embodiments of the present invention, the lighting device comprises a light source 10 and a collimating lens 20. The light source 10 has a lamp (not shown) that generates white light and a reflection mirror (not shown) for reflecting the white light emitted from the lamp and for guiding the light onto the collimating lens 20. The collimating lens 20 is arranged between the light source 10 and the beam splitter 30 for collimating the reflected light. After passing through the collimating lens 20, the reflected light is collected as the collimated light which has a small irradiation area, so that the volume of the projection system 1 is reduced.

Figure 2A:
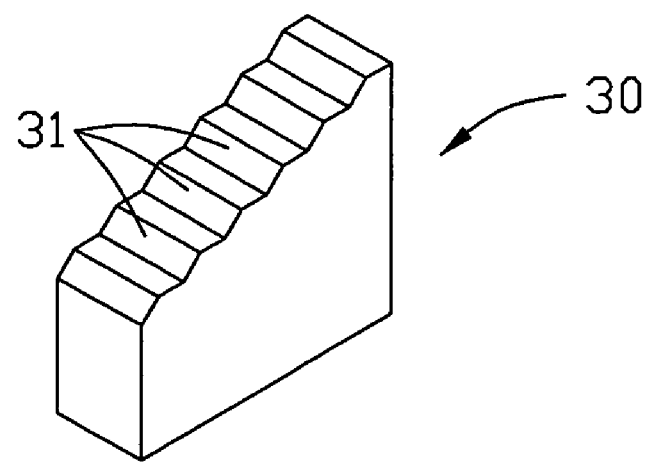
FIG. 2A is a schematic diagram of a beam splitter of the projection system of FIG. 1.

Also referring to FIG. 2A, the beam splitter 30 has a stepped face forming a plurality of alternating and gradient reflecting portions 31 thereon. Each reflecting portion 31 has a width of "d" in a first direction (the incident direction of the collimated light), and adjacent reflecting portions 31 are spaced at an interval of "D" in the first direction. All reflecting portions 31 reflect the incident collimated light at the same angle but in different positions of the light path of the collimated light, so that the incident collimated light are divided into separate collimated beams which transmit in a second direction different from the incident direction of the collimated light. In an embodiment of the present invention, the collimated light emitted from the lighting device is horizontally incident onto three reflecting portions 31 of the beam splitter 30, and preferably, but not necessarily, perpendicularly reflected by the reflecting portions 31 to form three collimated beams having the same width of "d" and an interval of D=2d. The number of reflecting portions 31 that are included in the beam splitter 30 and the width "d" and the interval "D" of the reflecting portions 31 of the beam splitter 30 can be varied according to the irradiation area of the collimated light to ensure that all collimated light is properly reflected by the beam splitter 30. The configuration of the beam splitter 30 can be varied according to the number and the dimension of the reflecting portions 31 to reduce the volume and cost of the projection system 1.

Figure 3:
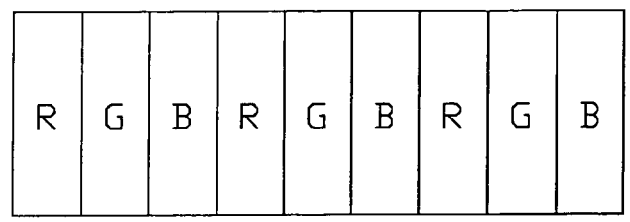
FIG. 3 illustrates a color bar produced by a color separator of the projection system of FIG. 1.

The color separation unit of the projection system 1 comprises a color separator 40 and a color scrolling wheel 50. The color separator 40 is a refracting lens made of translucent material and slantingly disposed at a first predetermined angle with respect to the axes of the collimated beams coming from the beam splitter 30. Each collimated beam is incident to the color separator 40 and refracted on a first interface 41. Due to the different refractive indexes of different color components contained in each collimated beam, the collimated beam is separated into a plurality of color beams which have different bandwidths and different light paths. The color beams travel through the color separator 40 to the color scrolling wheel 50 after another refraction on a second interface 42 of the color separator 40. The color beams have a total width of d+D in the first direction after passing through the color separator 40. Particularly in the preferred embodiments of the present invention, the collimated light is split into three collimated beams by three reflecting portions 31 of the beam splitter 30, and the three collimated beams are each separated into a red (R), a green (G) and a blue (B) color beams to form nine interlaced color beams (as shown in FIG. 3) by the color separator 40.

Figure 2B:
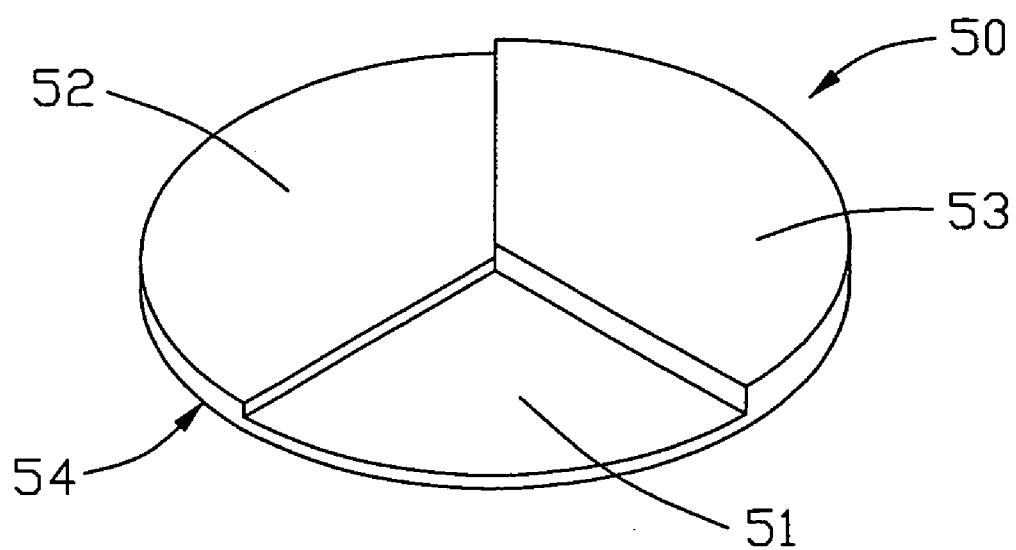
FIG. 2B is a schematic diagram of a color scrolling wheel of the projection system of FIG. 1.

The color scrolling wheel 50 of the color separation unit is disposed on the light paths of the R, G, B color beams transmitted by the color separator 40, and is rotated at a predetermined speed for scrolling the R, G and B color beams. The color scrolling wheel 50 comprises a substrate 54 and a plurality of reflecting areas of different thickness is formed on the substrate 54. The number of reflecting areas is equal to that of the color beams separated by one collimated beam. Referring to FIG. 2B, according to the preferred embodiments of the present invention, the color scrolling wheel 50 is substantially formed in the shape of a disk which is rotatable about a geometrical axis thereof. The color scrolling wheel 50 forms three continuous and fan-shaped reflecting areas thereon, which are respectively referred to as first, second, and third reflecting areas 51, 52 and 53. The second reflecting area 52 is thicker than the first reflecting area 51, and thinner than the third reflecting area 53. The first, second, and third reflecting areas 51, 52 and 53 are located in different distances from the optical axis of the R, G, B color beams due to the different thicknesses thereof and the inclined arrangement of the color scrolling wheel 50. Therefore, with the rotation of the color scrolling wheel 50, the nine incident color beams from the color separator 40 are respectively reflected to the imaging display unit by the first, second, and third reflecting areas 51, 52 and 53 in turn, thereby forming interlaced color bars (detailed described below).

Figures 4A, 4B, 4C:
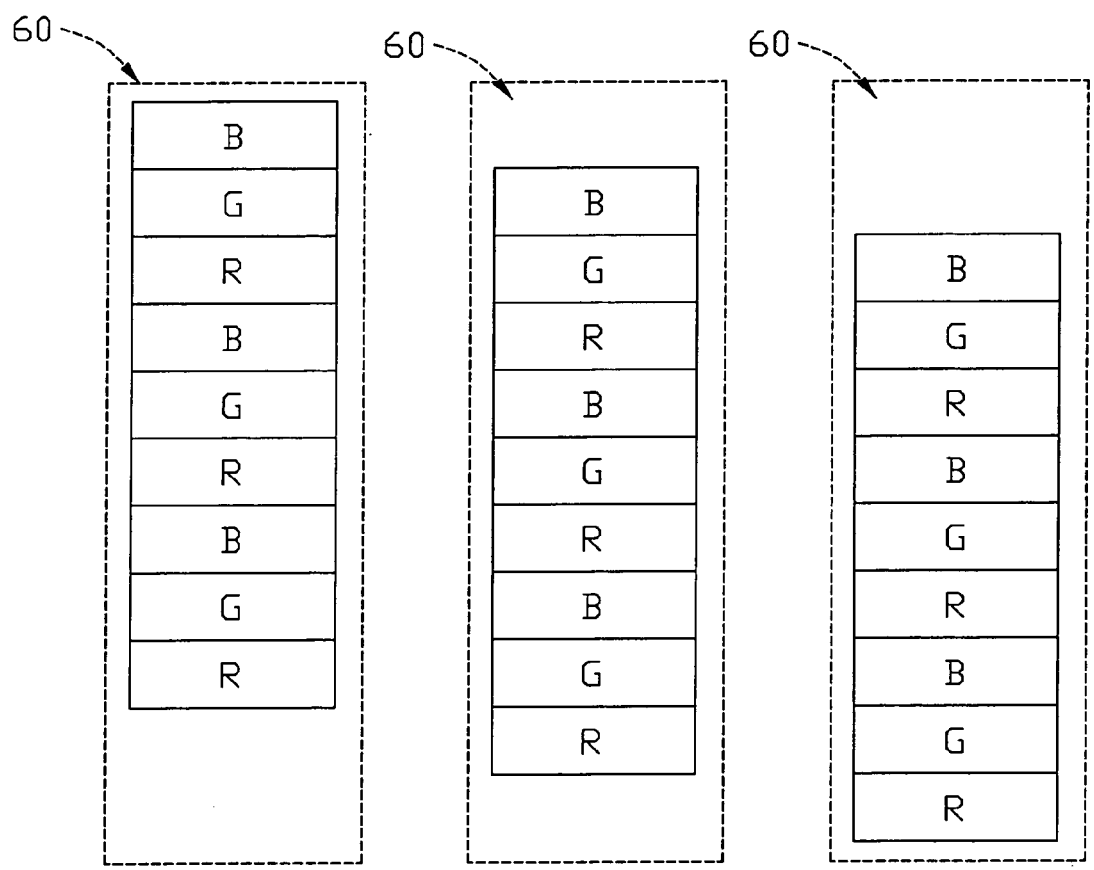
FIG. 4A shows a first color bar formed on a first location of an imaging device of the projection system of FIG. 1, the first color bar being produced by color beams reflected by a first reflecting area of the color scrolling wheel.
FIG. 4B shows a second color bar formed on a second location of the imaging device of the projection system of FIG. 1, the second color bar being produced by color beams reflected by a second reflecting area of the color scrolling wheel.
FIG. 4C shows a third color bar formed on a third location of the imaging device of the projection system of FIG. 1, the third color bar being produced by color beams reflected by a third reflecting area of the color scrolling wheel.

The imaging display unit comprises an imaging device 60 and a projecting lens 70. When the color scrolling wheel 50 is rotated to a first position in which the first reflecting area 51 faces the incident R, G, B color beams, the color beams are reflected by the first reflecting area 51 to form a first color bar on a first location of the imaging device 60, as shown in FIG. 4A. When the color scrolling wheel 50 is then rotated to a second position in which the second reflecting area 52 faces the incident R, G, B color beams, the color beams are reflected by the second reflecting area 52 to form a second color bar on a second location of the imaging device 60, as shown in FIG. 4B. When the color scrolling wheel 50 is then rotated to a third position in which the third reflecting area 53 faces the incident R, G, B color beams, the color beams are reflected by the third reflecting area 53 to form a third color bar on a third location of the imaging device 60, as shown in FIG. 4C. The color scrolling wheel 50 is rotated repetitively, so that the color beams are scrolled.

The imaging device 60 modulates the scrolled color beams according to image signals provided by an image, and forms a picture thereon. In an embodiment of the present invention, the imaging device 60 is a transmissive liquid crystal display (LCD), which modulates the scrolled color beams on a plurality of cells thereof by controlling the refractive index and the transmissive index of each cell according to a corresponding image signal. The projecting lens 70 magnifies the picture formed by the imaging device 60 and projects the magnified picture onto a screen (not shown).

Figure 5:
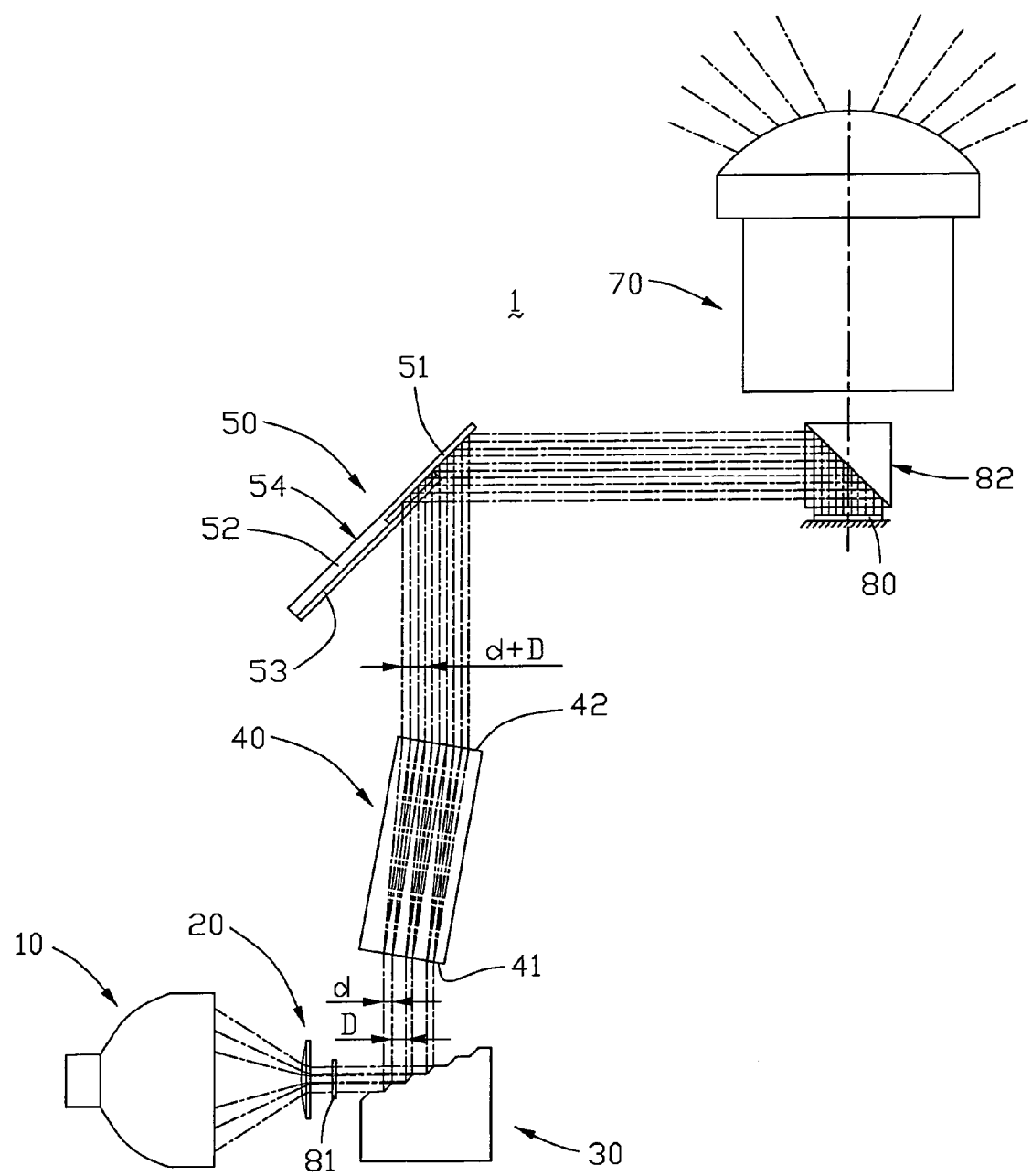
FIG. 5 is a schematic diagram of a projection system according to a second embodiment of the present invention, mainly showing the basic optical components and the optical paths thereof.

In other embodiments of the present invention, the imaging device 60 can also use a reflective LCD, a liquid crystal on silicon (LCoS) or a digital micromirror device (DMD), which are all well known by one skilled in the art. The projection system 1 needs to be partially adjusted according to the characteristics of the imaging device 60 adopted therein. For example, referring to FIG. 5, when an LCoS 80 is used between the color scrolling wheel 50 and the projecting lens 70 as an imaging device, the projection system 1 is almost the same as disclosed in the first embodiment, except adding a polarization converter 81 between the collimating lens 20 and the beam splitter 30, and a polarization beam splitter 82 before the projecting lens 70.

It is to be understood, however, that even though numerous characteristics and advantages of the present invention have been set forth in the foregoing description, together with details of the structure and function of the invention, the disclosure is illustrative only, and changes may be made in detail, especially in matters of material, plating method and manufacturing process within the principles of the invention to the full extent indicated by the broad general meaning of the terms in which the appended claims are expressed.

What is claimed is:

1. A projection system comprising:
   an irradiation unit, which generates a plurality of collimated beams, each having a predetermined width, and spaced from each other at a predetermined interval;
   a color separation unit comprising a color separator that separates each collimated beam into a number of color beams having a total width corresponding to the sum of the predetermined width and the predetermined interval and a color scrolling means having a number of reflecting areas with different thicknesses for reflecting the color beams transmitted by the color separator in turn, the number of reflecting areas being equal to that of the color beams separated by one collimated beam; and
   an imaging display unit for modulating the color beams reflected by the color scrolling means according to image signals provided by an image to form a picture, and magnifying the picture for projection onto a screen.

2. The projection system as claimed in claim 1, wherein the irradiation unit comprises a light source generating white light, a collimating lens collimating the white light into collimated light, and a beam splitter splitting the collimated light into the plurality of collimated beams.

3. The projection system as claimed in claim 2, wherein the imaging device comprises a liquid crystal on silicon, and a polarization converter is arranged between the collimating lens and the beam splitter.

4. The projection system as claimed in claim 2, wherein the imaging device comprises a liquid crystal display.

5. The projection system as claimed in claim 2, wherein the beam splitter comprises a plurality of reflecting portions disposed in different positions of the light path of the collimated light for respectively reflecting the collimated light to form the collimated beams.

6. The projection system as claimed in claim 5, wherein the beam splitter has a stepped face, the reflecting portions being alternatingly and gradient formed on the stepped face.

7. The projection system as claimed in claim 6, wherein each reflecting portion has a predetermined width in the incident direction of the collimated light, and adjacent reflecting portions are spaced at a predetermined interval in the same incident direction.

8. The projection system as claimed in claim 1, wherein the color scrolling means comprises three reflecting areas, and each collimated beam is separated into a red, a green and a blue color beams by the color separator.

9. The projection system as claimed in claim 1, wherein the color scrolling means is slantingly disposed on the light path of the color beams, and the reflecting areas are located in different distances from the optical axis of the color beams.

10. The projection system as claimed in claim 1, wherein the projection system is a single-panel projection system having one single imaging device.

11. A projection system comprising:
    an irradiation unit that generates a plurality of separate collimated white beams;
    a color separator that separates color components of the collimated white beams to form a plurality of color beams by means of refraction on a first interface thereof, the color beams transmitting from a second interface of the color separator after a second refraction on the second interface;
    a color scrolling means scrolling the color beams passing through the color separator;
    an imaging device for forming a picture thereon by modulating the scrolled color beams according to image signals provided by an image; and
    a projecting lens for magnifying the picture and projecting the magnified picture onto a screen.

12. The projection system as claimed in claim 11, wherein the color scrolling means is substantially in the shape of a disk having a geometrical axis and is rotatable about the axis.

13. The projection system as claimed in claim 12, wherein the color scrolling means is slantingly disposed on the light path of the color beams, and comprises a plurality of reflecting areas with different thicknesses.

14. The projection system as claimed in claim 13, wherein, with the rotation of the color scrolling means, the color beams are reflected to the imaging device by the plurality of reflecting areas in turn, and are thus scrolled on the imaging device.

15. The projection system as claimed in claim 13, wherein the number of reflecting areas is equal to that of the color components comprised in each collimated beam.

16. The projection system as claimed in claim 13, wherein the irradiation unit comprises a light source that generates white light, a collimating lens that collimates the white light into collimated light, and a beam splitter that splits the collimated light into the plurality of separate collimated beams.

17. The projection system as claimed in claim 16, wherein the imaging device comprises a transmitive liquid crystal display.

18. The projection system as claimed in claim 16, wherein the imaging device comprises a liquid crystal on silicon, and a polarization converter is arranged between the collimating lens and the beam splitter.

19. A single-panel projection system comprising:
a lighting device that generates collimated light;
a beam splitter that splits the collimated light into a plurality of collimated beams;
a color separator that separates each collimated beam into a plurality of color beams;
a color scrolling wheel rotatably disposed on the light path of the color beams and having a plurality of reflecting areas with different thicknesses for scrolling the color beams, the reflecting areas being located in different distances from the optical axis of the color beams;
an imaging device for imaging a picture by modulating the scrolled color beams; and
a projecting lens for magnifying the picture and projecting the magnified picture onto a screen.

20. The single-panel projection system as claimed in claim 19, wherein the beam splitter comprises a plurality of reflecting portions slantingly disposed in different positions of the light path of the collimated light for respectively reflecting the collimated light.

21. The single-panel projection system as claimed in claim 19, wherein each collimated beam has a predetermined width, adjacent collimated beams being spaced at a predetermined interval, and the color beams having a total width corresponding to the sum of the width and the interval after passing through the color separator.

22. The single-panel projection system as claimed in claim 19, wherein the color scrolling wheel is substantially in the shape of a disk having a geometrical axis and is rotatable about the axis.

* * * * *